United States Patent [19]
Radican

[11] Patent Number: 5,712,789
[45] Date of Patent: Jan. 27, 1998

[54] CONTAINER MONITORING SYSTEM AND METHOD

[75] Inventor: Joseph E. Radican, Wellington, Ohio

[73] Assignee: K&T Ltd., Avon, Ohio

[21] Appl. No.: 519,888

[22] Filed: Aug. 28, 1995

[51] Int. Cl.$^6$ .................................. G06F 19/00
[52] U.S. Cl. ............... 364/478.14; 395/228; 395/229
[58] Field of Search ............. 364/478.01, 478.03, 364/478.09, 478.08, 478.1, 478.13, 478.14, 478.15, 478.16, 478.17; 235/375, 383, 385; 395/228, 229

[56] References Cited

U.S. PATENT DOCUMENTS 4,509,123  4/1985  Vereen .
5,038,283  8/1991  Caveney ......................... 364/403
5,043,908  8/1991  Manduley et al. ............. 364/478.15
5,122,959  6/1992  Nathanson et al. .
5,493,491  2/1996  Calcerano et al. ............. 364/403

*Primary Examiner*—Reba I. Elmore
*Assistant Examiner*—Thomas E. Brown
*Attorney, Agent, or Firm*—Calfee, Halter & Griswold LLP

[57] ABSTRACT

A container monitoring system and method tracks location and load status of shipping containers within a defined premises and generates container status reports for customers receiving containers, suppliers or shippers of goods, and container carriers. Carrier and container identifiers are used to track and monitor movements and status of each container from a point of departure to a final destination and return. A combined computer and telecommunications system is also disclosed for executing the tasks of the container monitoring system.

19 Claims, 8 Drawing Sheets

DETAIL ON HAND

| CARRIER | CARRIER NAME | DATE | TIME | DOCK | YARD | STATUS | TRAILER | PACKING LIST |
|---|---|---|---|---|---|---|---|---|
| ADXR | A.D. TRANSPORT | 06/26/95 | 09:39 | | N | EMPTY | 16504 | |
| ADXR | A.D. TRANSPORT | 06/26/95 | 08:46 | | N | EMPTY | 92018 | |
| ADXR | A.D. TRANSPORT | 06/22/95 | 13:21 | | N | TRUCK LOAD | 92020 | |
| BGTH | BIG THREE EXPEDITERS | 06/21/95 | 01:51 | | N | PARTIAL LOAD | 482417 | |
| CAAY | C & A TRANSPORTATION | 06/26/95 | 02:55 | | N | TRUCK LOAD | 1916 | |
| CAAY | C & A TRANSPORTATION | 06/26/95 | 17:48 | | N | TRUCK LOAD | 1939 | |
| CAAY | C & A TRANSPORTATION | 06/26/95 | 02:57 | | N | TRUCK LOAD | 1945 | |
| CAAY | C & A TRANSPORTATION | 06/26/95 | 16:54 | | N | TRUCK LOAD | 1946 | |
| CAAY | C & A TRANSPORTATION | 06/26/95 | 02:57 | | N | TRUCK LOAD | 1949 | |
| CAAY | C & A TRANSPORTATION | 06/20/95 | 19:32 | | N | RACKS OUTBOUND | 1950 | |
| CAAY | C & A TRANSPORTATION | 06/26/95 | 02:56 | | N | TRUCK LOAD | 1951 | |
| CAAY | C & A TRANSPORTATION | 06/23/95 | 19:14 | | N | TRUCK LOAD | 1952 | |
| CAAY | C & A TRANSPORTATION | 06/27/95 | 02:54 | | N | RACKS OUTBOUND | 1954 | |
| CAAY | C & A TRANSPORTATION | 06/26/95 | 21:06 | | N | TRUCK LOAD | 1955 | |
| CAAY | C & A TRANSPORTATION | 06/27/95 | 03:57 | | N | RACKS OUTBOUND | 5308 | |
| CAAY | C & A TRANSPORTATION | 06/26/95 | 10:33 | 38 | N | | 5309 | |
| CAAY | C & A TRANSPORTATION | 06/27/95 | 03:17 | 37 | N | | 5318 | |

FIG. 3

EMPTY TRAILER REPORT
UNNOTIFIED CARRIERS

| CARRIER | CARRIER NAME | TRAILER | DOCK | YARD | STATUS | PACKING LIST | RETENTION HOURS | |
|---|---|---|---|---|---|---|---|---|
| ADXR | A.D. TRANSPORT | 92020 | | N | TRUCK LOAD | | 115 | *PAST DUE* |
| BGTH | BIG THREE EXPEDITERS | 482417 | | N | PARTIAL LOAD | | 451 | *PAST DUE* |
| CAAY | C & A TRANSPORTATION | 1916 | | N | TRUCK LOAD | | 30 | *PAST DUE* |
| | | 1939 | | N | TRUCK LOAD | | 15 | *PAST DUE* |
| | | 1945 | | N | TRUCK LOAD | | 30 | *PAST DUE* |
| | | 1946 | | N | TRUCK LOAD | | 16 | *PAST DUE* |
| | | 1949 | | N | TRUCK LOAD | | 30 | *PAST DUE* |
| | | 1951 | | N | TRUCK LOAD | | 30 | *PAST DUE* |
| | | 1952 | | N | TRUCK LOAD | | 85 | *PAST DUE* |
| | | 1955 | | | TRUCK LOAD | | 11 | *PAST DUE* |
| | | 5309 | 38 | | TRUCK LOAD | | 30 | *PAST DUE* |
| | | 5318 | 37 | | TRUCK LOAD | | 30 | *PAST DUE* |
| | | 5325 | 32 | | TRUCK LOAD | | 12 | *PAST DUE* |
| | | 5332 | | N | TRUCK LOAD | | 10 | *PAST DUE* |
| | | 700 | | N | TRUCK LOAD | | 13 | *PAST DUE* |
| CIEG | CIMARRON EXPRESS | 48383 | | N | TRUCK LOAD | | 16 | *PAST DUE* |
| | | 485903 | | N | TRUCK LOAD | | 25 | *PAST DUE* |
| | | 534611 | | N | TRUCK LOAD | | 2 | *PAST DUE* |
| | | 538355 | | N | TRUCK LOAD | | 2 | *PAST DUE* |
| | | 851589 | 56 | | TRUCK LOAD | | 86 | *PAST DUE* |
| | | 851659 | | N | TRUCK LOAD | | 13 | *PAST DUE* |
| | | 851765 | | | TRUCK LOAD | | 18 | *PAST DUE* |
| CRBR | CREECH BROTHERS | 53151 | 62 | | PARTIAL LOAD | | 27 | *PAST DUE* |
| | | 5321 | | W | TRUCK LOAD | | 8 | *PAST DUE* |
| | | 53211 | | N | TRUCK LOAD | | 20 | *PAST DUE* |
| | | 53260 | 22 | S | TRUCK LOAD | | 28 | *PAST DUE* |
| | | 53281 | | | TRUCK LOAD | | 24 | *PAST DUE* |
| | | 53331 | | S | TRUCK LOAD | | 1 | *PAST DUE* |
| CUIT | CUSTOMIZED TRANSPORTATION INC. | 0519 | 3 | | TRUCK LOAD | | 10 | *PAST DUE* |
| | | 0520 | 59 | N | TRUCK LOAD | | 8 | *PAST DUE* |
| | | 0522 | | N | TRUCK LOAD | | 8 | *PAST DUE* |
| | | 0541 | 18 | | TRUCK LOAD | | 4 | *PAST DUE* |
| | | 0547 | | | TRUCK LOAD | | 90 | *PAST DUE* |
| | | 0582 | | S | PARTIAL LOAD | | 26 | *PAST DUE* |
| | | 0603 | 20 | N | TRUCK LOAD | | 7 | *PAST DUE* |
| | | 100138 | | N | TRUCK LOAD | | 19 | *PAST DUE* |
| | | 100154 | | N | TRUCK LOAD | | 23 | *PAST DUE* |
| | | 100242 | | N | TRUCK LOAD | | 19 | *PAST DUE* |
| | | 100281 | | | TRUCK LOAD | | 8 | *PAST DUE* |

FIG. 4

```
                                                  08/22/95  1:18:03 pm
┌ESC=Exit──│ F1=Help─────────────────│ Group    ─│ Plant ──────────┐
│Trailer Maintenance Screen           │ MATG2     │ OHIO TRUCK      │
│                                                                   │
│ Plant> (OHIO TRUCK)                                               │
│       Trailer> 223        Carrier> CI                             │
│       Shipper#>                                                   │
│                                                                   │
│ Type!Description-------------        Yard!Dock!Description------- │
│     !                                    !    !                   │
│                                                                   │
│ ----!Arrived-!LastMove!Notified!Retained                          │
│ Date!08/22/95!  /  /  !  /  /  !  /  /                            │
│ Time!13:17   !   :    !   :    !   :                              │
│                                                                   │
│ Comment ■                      CARRIER                          ≡ │
│         Ccarrier│Ccarname                                       ▲ │
│                                                                   │
│         CHTL    │CHURCHILL                                        │
│         CIEG    │CIMARRON EXPRESS                                 │
│         CLCO    │CLEVELAND COURIER EXPEDITING                   ▼ │
│        ◄                                                        ► │
│                                                                   │
│                    [ Press F10 to exit ]                          │
└───────────────────────────────────────────────────────────────────┘
```

FIGURE 6A

```
                                                     08/22/95  1:14:16 pm
┌ESC=Exit──┤ F1=Help────────────────────┤ Group    ──┤ Plant ───────────┐
│Trailer Maintenance Screen              │ MATG2      │ OHIO TRUCK       │
└──────────────────────────────────────────────────────────────────────┘
 Plant> (OHIO TRUCK)
        Trailer> 223302     Carrier> CUIT     (CUSTOMIZED TRANSPORTATI)
        Shipper#>

Type:Description-------------       Yard:Dock:Description-----------
 MT   :EMPTY                          W  :    :YARD, WEST ----:Arrived-:LastMove:Notified:Retained
 Date:08/01/95:08/02/95:  /  /  :08/02/95
 Time:09:18   :22:19   :   :    :22:19
┌═══════════════════════════════[ Press F10 to exit ]═══════════════════┐
│ Spot Date      Spot Time      Transaction  Transaction Description    │
│ 08/22/95       13:14          MT           EMPTY                      │
│                                                                       │
│ Exit to Yard                               Exit to Dock               │
│                                                                       │
│ Comment                                                               │
│                                                                       │
│                                                                    >  │
└───────────────────────────────────────────────────────────────────────┘
```

FIGURE 6B

```
                                                        08/22/95  1:09:13 pm
┌ESC=Exit───┤ F1=Help──────────────────────────────────────────────────────┐
│Trailer Maintenance Screen                        | MATG2     | OHIO TRUCK│
│                                                                          │
│  Enter Group Id>       2  MATG2                                          │
│  Enter Plant Id>       22 OHIO TRUCK                                     │
│                                                                          │
│         Trailer Id>                                                      │
│         Carrier Id>                                                      │
│         Shipper # >                                                      │
│         In Yard>          In Dock>           In Type>                    │
│                                                                          │
│         Arriving Between >   / /    and   / /                            │
│         Last Moved Between>  / /    and   / /                            │
│                                                                          │
└──────────────────────────────────────────────────────────────────────────┘
```

FIGURE 6C

CONTAINER MONITORING SYSTEM AND METHOD

FIELD OF THE INVENTION

The present invention pertains generally to systems and methods for data acquisition and information management and, more particularly, to data acquisition and information management systems for tracking the location and status of moveable objects.

BACKGROUND OF THE INVENTION

Information is critical to every business. Businesses can increase efficiency and profitability by acquiring and making use of greater amounts of information. In highly dynamic businesses such as shipping and continuous assembly manufacturing, the value of information is inversely proportional to the age of the information. With the advent of the computer, information acquisition, management and usage has dramatically improved in all areas of human activity. In many areas, potentially valuable information which is readily available is not gathered and used to the extent possible, simply because no one has devised ways to acquire, manage and use such information.

Modern manufacturing procedures require product assembly parts to arrive just-in-time at assembly facilities to reduce or eliminate parts inventories. This requires discrete tracking of loads and parts arriving at a manufacturing facility, and of part-carrying racks leaving the manufacturing facility, all within different types of shipping containers. Despite the many improvements in internal manufacturing efficiency, the critical parts supply delivery system has not been improved much beyond simply dropping a shipment at the door of a factory. This approach leaves production management personnel with the task of locating shipments and parts outside of the factory to coordinate final delivery of a shipment at a very specific location (dock or entry door) to a plant. In common shipping practice, receivers of goods carried by containers have only a bill of lading as a record of arrival of the goods at a destination. Even when the information from the bill of lading is recorded or otherwise transferred within an organization, the physical location of the goods identified by the bill of lading is not generally known or tracked or monitored once the container leaves the point of entry onto plant premises. This practice leads to the difficulty of locating shipments and parts which are located on the premises of a manufacturing or assembly facility but without any information other than that the shipment has arrived.

SUMMARY OF THE PRESENT INVENTION

The present invention overcomes these and other difficulties of container monitoring and of methods and systems of the prior art used to collect and manage shipping and container information. The present invention provides a container monitoring system which is an all-encompassing tracking system capable of tracking any identifiable container from a point of departure to a point of destination and return, or to a subsequent destination. The system and method of the invention provides real time data on container identification, location and load status. In one embodiment of the invention, the container monitoring system provides a computerized container tracking system which, with proper communication between suppliers, provides the interactive parties of suppliers, shippers, carriers and customers with twenty-four hour live data on container location status including but not limited to: country, state, county, city, address, specific location within an address, aisle at a specific address, slot or space number in a specific aisle, ocean, lake, river, port of entry, railroad terminal, airport, airport gate, etc.

In addition to container location status, the container monitoring system provides twenty-four hour live information to all interactive parties on the load status of containers such as "full", "partial load" or "empty". In accordance with the invention, this information can be used to automatically create schedules for container retrieval from delivery sites. With appropriate container and shipper identification, the container monitoring system of the invention accumulates, segregates and itemizes in reports amounts due shippers based upon data acquired, processed and stored by the system. The system uses this information, in combination with an accounts payable program to authorize payments to shipping companies with all necessary shipping data associated with each payment.

The container monitor system of the invention further has the ability to provide quantity controls and projections of capacity status for storage areas for containers. The system can forecast and prevent container capacity problems for particular storage or receiving areas based on information of expected delivery dates of containers. The system thus provides information necessary to allow customers, shippers and carriers to adjust respective scheduling in order to avoid insufficient capacity and/or excessive container retention problems.

In conjunction with the ability to track and forecast container capacity at a given location, the system can further track and forecast container load capacity by monitoring volume, space and/or weight capacity at receiving areas such as warehouses and land fills. The system identifies the shipper, transportation vehicle identification number and the quantity or volume of the shipment. This information, when calculated using container capacity levels, can be used to project the useful life of a delivery site such as a landfill based on contractual or estimated delivery of recorded shipment volumes.

In accordance with another aspect of the invention, a shipping company, knowing the volume and/or weight capacity of containers, can integrate information provided by the system with accounts receivable and billing programs to create efficient, verifiable and accurate billing statements. Shipper's accounts receivables and/or employee payrolls can be prepared in accordance with the invention by correlating identified containers with subcontractor invoices or designated employees so that invoices and payrolls are paid only upon confirmation of actual delivery of the identified container(s).

In accordance with still another aspect of the invention, the container monitoring system uses a data warehouse model which permits other networked computers programmed in non-common languages to receive data acquired and processed by the system for maximum distribution and usage of system data.

In accordance with other aspects of the invention, a variety of communications mediums can be used to update the data in the system including but not limited to telephone, radio and portable RF scanners. Personnel responsible for physical movement of containers within a container receiving area are instructed as to the initial location of containers and instructions as to final destination (unloading points) for containers, and the container movement personnel subsequently communicate to the system operator all movement of containers and load status. In order to insure accurate transmission of container movement and load status data, container movement personnel may be equipped with data verification modules in the form of, for example, RF scanners which scan and record bar coded information which may include container identification numbers, container locations, load status, scat codes or other identifying symbols of a carrier. Once such information has been input, the data verification module updates and corrects any defects or deficiencies in the information.

These and other aspects of the invention are described below in particularized detail with reference to the accompanying Figures.

BRIEF DESCRIPTION OF THE FIGURES

In the accompanying Figures:

FIG. 3 is an example of a container status report generated by the system;

FIG. 4 is another example of a container status report generated by the system, FIGS. 6A–6C are representative screen displays of a computer program which performs the container monitoring process of the present invention.

DETAILED DESCRIPTION OF PREFERRED EMBODIMENTS

Figure 1:
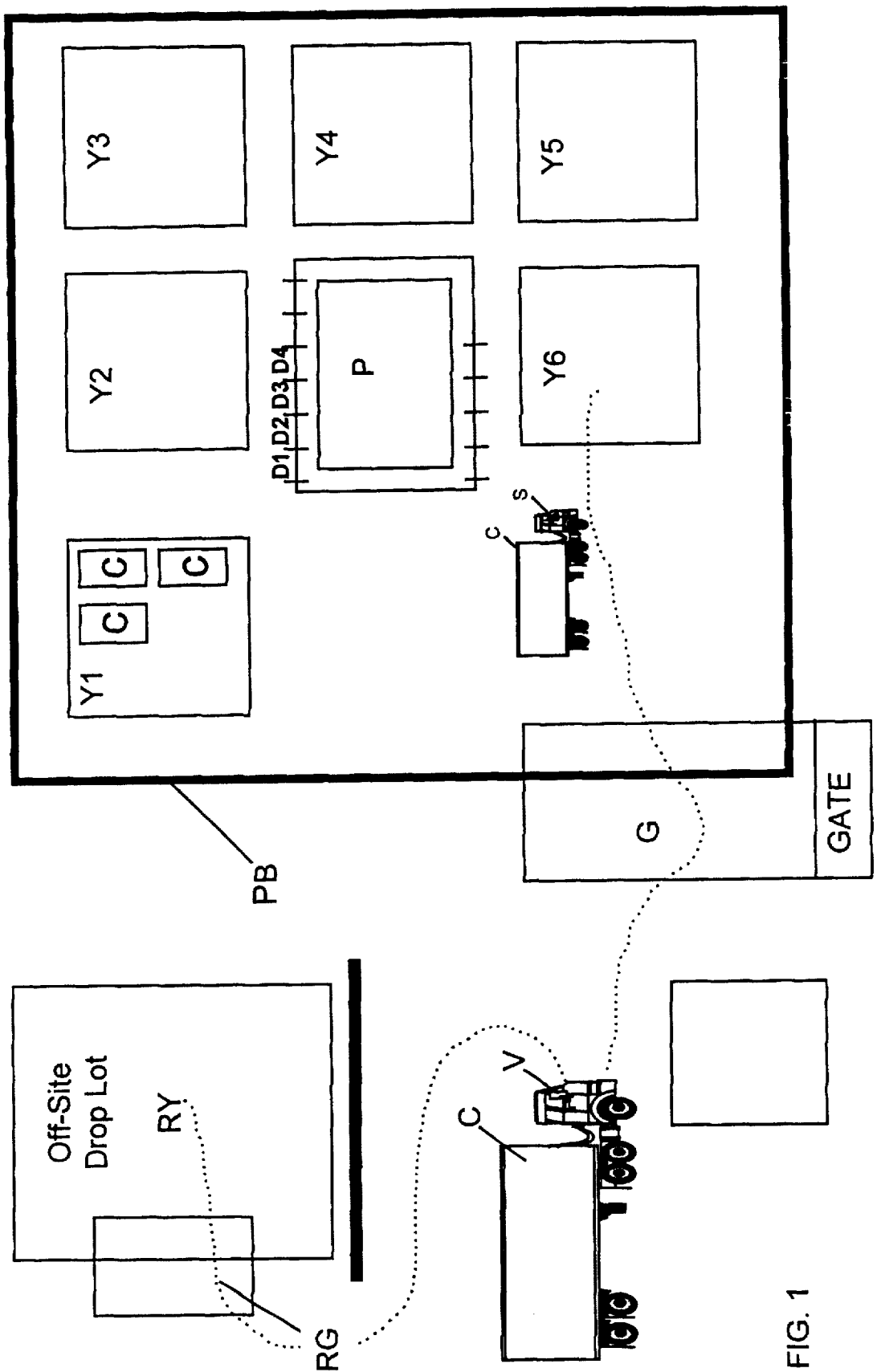
FIG. 1 is a schematic diagram of the operational components of one embodiment of the container management system of the present invention.

FIG. 1 schematically illustrates the basic physical components of one application of the container monitoring system to, for example, the movement of containers C (pulled by a carrier vehicle V) arriving, moving about, and departing from the premises of a manufacturing or assembly plant P having physical boundaries $P_B$. As used herein, the term "system" refers to the described method of container monitoring, and to the equipment used to execute the steps of the system. In this embodiment, the system accumulates, stores and disseminates information on containers with respect to the location of containers relative to plant boundaries $P_B$, locations within the plant boundaries but outside the plant referred to as receiving areas or yards Y, and docks D which are designated entrances or doors to plant P. Entry and exit to and from the plant premises is directed through and controlled by gate G. As used herein, the term "system" refers to all of the methods and apparatus of the invention used to move and monitor containers and to record, store, manipulate and transmit data relative to container monitoring.

FIG. 1 is representative of only the most basic physical arrangement of a plant and container receiving/shipping facility with which the system of the invention may be applied. For example, as further detailed below, the system is readily adaptable to facilities having complex geographic layouts, multiple plants with multiple docks and multiple entry and exit points with gates, receiving areas or yards, off-site container holding areas. One example of such adaptation is further illustrated by FIG. 1 wherein an off-plant premises remote receiving area RY is provided with its own gate RG. In this type of arrangement the physical control of the system over containers destined for interface with the plant is extended beyond the plant boundaries $P_B$ without affecting the information acquisition and management on containers still remote from plant premises. As will be appreciated, in any adaptation the system is not limited by the type of facility or container, or by the mode of transport of containers.

As further detailed in FIG. 1, each receiving area Y is assigned a unique designator such as Y1, Y2, ... etc. which may be associated with a dock D or group of docks also uniquely designated such as D1, D2 etc. Carriers (meaning the entities and vehicles used to convey or move containers) are uniquely identified by, for example, SCAT codes as used in the trucking industry, and truck trailer numbers such as the six digit truck container numbering convention used in the United States and the seven digit numbering convention for inter-modal type containers. To monitor other types of containers such as inter-modal ship/rail/truck containers, air freight containers, or any other type of shipping container, a similar carrier/container numbering or coding system. For example, an electronic envelope may be created to track a single container which may be carried by different carriers in different modes such as ship, train, truck or aircraft.

Once the receiving areas Y of the plant premises and the plant entrances (docks D) are uniquely designated, and all incoming carriers and containers are uniquely labelled, the system has a basic framework for monitoring, compiling and providing information for efficiently locating and controlling movement of containers from point of origin to point(s) of destination and within plant premises, as further described below.

The system monitors and records all container movement within the plant premises by tracking locations of containers made by container moving means S within the plant premises, for example, from the gate G to receiving areas Y, from remote receiving area RY to receiving areas Y, from receiving areas Y to plant entrance docks D and back to receiving areas. In the case of wheeled containers such motive means S may include tractors or trucks commonly known as switch trucks or trailer jockeys or shunters. The shunters S perform the task of physically moving containers to designated receiving areas Y or docks D according to information provided by the system and by the operations management of the plant as further described below. In other applications, shunters S may be rail-based engines, mobile cranes or hoists, aircraft, watercraft, or fixed conveyer systems, or any other mechanical motive system operative to physically move a container and/or container contents from one location to another.

Other physical facilities to which the system may analogously be applied include, for example, a land fill wherein the dumping areas of the fill constitute receiving areas within premises boundaries accessible through a gate or gates; a shipping port wherein ship docks constitute gates to receiving areas proximate the docks, and the container moving means are cranes which unload the ships; or a rail yard with adjacent warehouses or holding lots, wherein entry to the yard is controlled by track switches which act essentially as gates and the warehouses or holding lots serve as receiving areas. Air freight containers can be similarly monitored by the system by tracking carrier and flight identification numbers at an arrival airport, gate numbers and warehouse-type receiving areas of containers.

Figure 2:
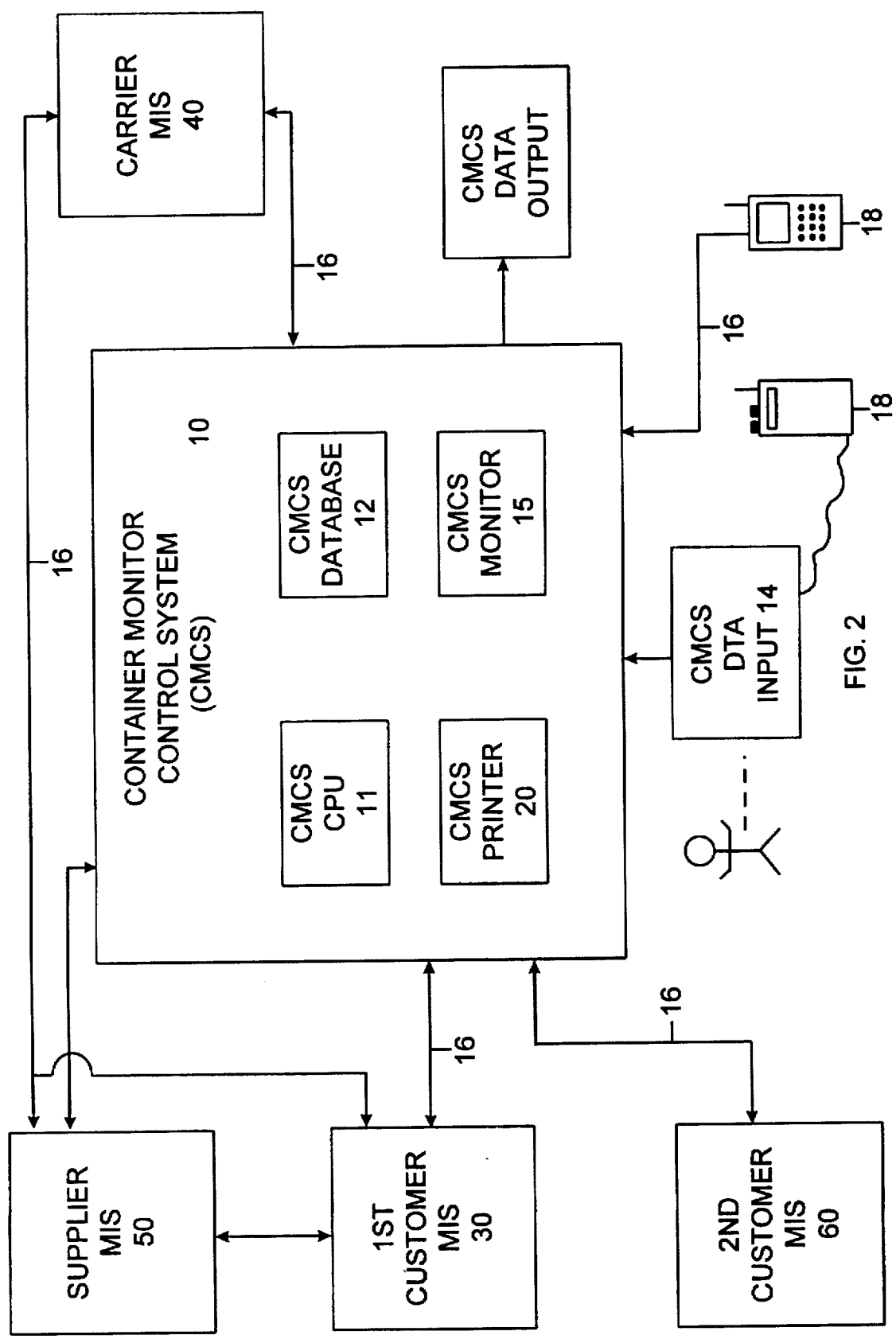
FIG. 2 is a schematic diagram of certain computing hardware and peripheral components of one embodiment of the container monitoring system of the present invention.

FIG. 2 schematically illustrates certain container information gathering, management and usage communication and computing equipment such as computing hardware and software connected and programmed for use with the physical arrangement of a plant and/or container shipping operation or any operation involving movement of containers. A container monitoring control system (CMCS) 10 includes, for example, a central processing unit 11 such as a mainframe or microprocessor for receiving and processing container-related data, a container monitoring system database 12, one or more container data input terminals 14 which may be locally or remotely located from the CMCS 10, a CMCS monitor 15, communications links 16 to remote computing systems and/or data receiving modules such as facsimile or E-mail facilities, remote container data transceivers 18, and one or more printers 20 for producing hard copy reports of container data acquired and processed by the CMCS. In one possible hardware arrangement of the system, one or more container data input terminals 14 and monitors 15 may be located at a gate or gates G for input of data acquired from incoming and outgoing containers into the CMCS 10. One form of data identification and input is by a human operator at terminal 14. Other methods and apparatus used by the container monitoring system for data transfer to and from CMCS 10 include hand held radios such as Motorola Model HT1000 which may be operated by drivers of switching trucks S to communicate to an operator at terminal 14 positions and status of containers for input of such data to the CMCS 10. Another type of data input and confirmation device which may be used with the system is a hand held optical scanner or RF optical scanner such as the PTC 912 and PTC 912DS products of Telxon, Inc. which may be programmed to read bar codes on containers. Alternatively, remote terminal devices with a data display and input keypad, such as used in taxicab dispatch, may be provided in the switching trucks S.

The CMCS 10 is interoperable with other computing systems such as for example a management information system (MIS) of a facility to which containers are delivered (herein, "1st customer MIS" or "customer MIS"), and/or an end or intermediate customer (herein "2d customer MIS"), and/or an MIS of a container carrier business (herein "carrier MIS"). As further shown in FIG. 2, in a preferred embodiment of the invention the CMCS 10 is commonly linked with a plant or customer MIS 30 and container carrier MIS 40 for cross exchange of container data. Of course connections could also be made to additional MISs and/or databases to further expand the accessibility of container data compiled by the CMCS 10. As well known in the business management and computing arts, an MIS generally includes a set of data collection, analysis and reporting tools which support decision making needs. A computerized MIS generally includes a database accessible by a computer programmed with data analysis and reporting software to generate informational reports to management personnel.

A typical container monitoring sequence is now described with reference to the physical arrangement of FIG. 1 and the monitoring hardware and software described above. As a container C (pulled by a carrier vehicle V) approaches gate G of plant P, the carrier and container identifying indicia on the vehicle (for example a SCAT code) which is input to the CMCS along with a corresponding container number which appears on the exterior of the container, along with the time of arrival. The recorded time of arrival of a container starts a retention time clock to accurately measure the total amount of time a container is retained on the premises of the destination facility such as plant P. This information is critical to both carriers and customers. Container retention times recorded by the system clearly identify for carriers containers which are held for excessive amounts of time. Customers, i.e., the ultimate recipients of the container contents, who must pay carriers for excess retention time of containers can use the information provided by the system to independently verify charges from carriers for excess retention.

In a preferred method of the invention, the carrier/container combination of data for each arriving container has been transmitted from the carrier MIS to the customer MIS prior to the arrival of the container, so that as the carrier and container are identified and input to the CMCS upon arrival at plant P, and this information transmitted from the CMCS to the customer MIS and/or carrier MIS, the system performs the function of communicating confirmation that a particular container has actually arrived at a destination. Once such confirmation is provided, the system continues to monitor the container about and within the premises of plant P.

Bill of lading information may also be transmitted from the carrier MIS to the customer MIS concerning each container, so that confirmation of arrival of the container (by identifying the carrier and container number only) is sufficient to enable to customer MIS to specifically identify, for example, parts which have arrived on the premises and thus available for assembly. Although it is not necessary for the container monitoring system to know the specific contents of any particular container (as represented by an accompanying bill of lading), it is information which can be readily input to the CMCS (either by the carrier MIS, customer MIS, or through CMCS input terminal 14) to enable confirmation of delivery of specific contents-identified containers. In other words, data of the contents of any container can be stored and associated with carrier/container identifications within the CMCS as an alternative or addition to the data contents of the customer or supplier MIS.

Shipping rates and cumulative charges associated with bills of lading may also be entered in the CMCS. This data may be correlated with an independent accounts payable program (for example resident in a customer MIS) whereby payments from a customer to a carrier can be authorized by the data from the CMCS. By this method, payments to carriers are made only for containers/goods which have actually been received or unloaded on the customer's premises. Similarly, carriers can use the delivery confirmation data provided by the system to generate bills to customers with actual confirmation that a particular delivery has been made.

As alternatives to monitoring location and status of specific contents of containers (which is contemplated by the invention), one method of the invention is to monitor the load status of any given container by using designations such as "full" or "truck load", "partial load" or "empty". Load designation conventions can be used such as labelling all incoming containers as "full" in the CMCS (regardless of whether a container is actually full) and all outgoing containers "empty", based upon indications from the customer who is responsible for unloading the container. "Partial loads" are also identified based upon information from the customer that a particular container, only partially unloaded, is to be removed from a dock and returned at a later time. Without the designation of such a container as a "partial load", the customer would have no efficient way of relocating the container when the remainder of the parts are needed, or of monitoring that the container still had parts in it and should not be allowed to leave the premises until empty. All such load status data is input to the CMCS in the manners described for transmission, by facsimile, electronic mail or through an internet or world wide web to the customer MIS and carrier MIS. Carriers are thus immediately notified when containers are empty and available for pick-up.

Also monitored by the system is cumulative load data for all incoming and outgoing containers for any particular premises or facility. By tabulating total number of container loads, the system keeps running figures on shipment volume within a premises. This data is then compared to known capacity values to evaluate and/or forecast facility utilization. One example of applicability of this aspect of the invention is to a land fill facility wherein containers are monitored by loads to continuously calculate remaining capacity of a land fill.

Associated with load status and container contents is data on part-carrying racks which fit inside containers. In certain applications of the system, monitoring of racks is equally or even more important than monitoring containers for the reason that certain parts cannot be carried in containers without specially adapted racks. For example, parts such as automobile engines cannot be shipped without empty racks being returned from an automobile assembly plant to an engine plant. Containers which hold such racks are therefore specially identified in the CMCS so that as such containers are completely unloaded, and empty racks placed back in the container, the container is specially identified as, for example, "racks outbound".

A container vehicle V or switcher S drops the container C in a receiving area Y outside or within plant boundaries $P_B$. The location of the initial drop off point is confirmed by communication from a remote container data transceiver 18 operated by personnel on the plant premises, such as a shunter driver, for immediate input to the CMCS. This begins the pattern of constant and immediate updating of container location and status by the CMCS to the customer MIS which enables the customer MIS to locate shipments without any searching or delay. The customer provides instructions on which containers are needed at which docks, i.e., switching instructions. Switching instructions may be generated by the customer MIS and delivered to operators of the switchers S or transmitted to the CMCS for communication to switchers S via remote data transceivers 18. Switching instructions are carried out by operators of switchers S which, in the example of a trucking operation, hook-up to a container such as a trailer and move it from a receiving area to the specified dock. The new location of the container is again reported to the CMCS in the form of a dock or gate number for updating of data on that container in the CMCS database. The amount of time the container remains at the dock is counted in the running retention time clock.

Subsequent container switching instructions received from the customer, for example to remove a container from a dock and return it to a yard, are similarly conveyed and executed by switchers S and reported for updating the CMCS database. The data of course includes the location of the container. Load status of a container is also updated according to information provided by the customer. For example, a container which is partially unloaded and then instructed to be returned to a receiving or holding area is noted in the system as a "partial load". The container is thus readily identifiable when instructed to be returned to continue unloading. In the instance where a single container is switched between a yard and dock or docks multiple times before leaving the premises, the system records each switching operation. This information is useful to the customer to identify excessive switching which indicates production or distribution process inefficiency. Because the system continuously tracks the location and status of all containers on the premises at all times, calculations can be made to determine available capacity for receiving additional containers. This includes calculations for one time deliveries such as to land fills.

Once a container is completely empty and returned to a yard, it is recorded in the CMCS database and reported to the carrier as empty and ready for departure from the premises. In order to communicate all of the data acquired by the CMCS relative to container location and status, including arrival and retention times and load status, the system is able to generate reports of container activity in any desired format for the benefit of all customers and all carriers delivering containers to customers. For example, as represented by FIG. 3, a "Detail on Hand" report 100 may be generated by the CMCS in any particular format such as columns and rows in which carriers and containers are listed with accompanying status data such as date and time of arrival, yard location and load status. In column 1 are listed carrier identifications such as SCAT codes for trucks. Column 2 identifies each carrier by full or abbreviated name. Column 3 lists the date of arrival of each container, and in column 4 is listed the time of arrival. In column 5 is listed the dock or docks at which a container is or was last unloaded. And in column 6 the current yard location of each container is listed. In column 7 is noted the status of the container load, which may include notations empty racks such as "racks outbound". Column 8 lists the container number which corresponds to the carrier. And column 9 is provided for entry of load-specific data such as contents identification and quantities and any other load data as may be included on, for example, a master packing list. The load specific data is critical to customers who pay suppliers on a "paid-on-production" system whereby suppliers are paid only upon assembly of parts into a finished product. By knowing that a certain shipment of parts actually arrived at the plant, and that the container left the plant in an empty state, the system provides the customer with independent verification for authorization of payments to suppliers. The load specific data may further include data on racks in containers. Since a load of racks will have a freight bill identifying the number and type of racks and destination, all of this information can be readily input to the CMCS, and set forth in column 9 of the report, to expedite the return of empty racks to a parts production facility.

The report of FIG. 3 is organized by carrier over a period of calendar days. Other report formats which the system may generate may be according to certain yards or receiving areas, times of arrival, unloading docks, container numbers for certain carriers, or load status. For example, report 120 as depicted in FIG. 4, is compiled as an "Empty Trailer Report" listing only trailer containers which are completely empty and ready for departure from the premises. This type of report is most valuable to carriers wanting to retrieve containers from the customer's premises as soon as possible. The report is also valuable to the customer for verifying over-retention charges by carriers. In this format, the carrier and containers are identified in column 1, the unloading dock in column 2, the current yard location in column 3, and the initial load type in column 4. A "packing list" column 5 is provided for entry of specific data on the contents of a container as described above. The figures in column 6 represent a total amount of time a container has been on the premises from the time of arrival to the time the report was generated. And column 7 is provided as a flag field for time measurements in column 6 which indicate containers "past due" for pick up.

Figure 5:
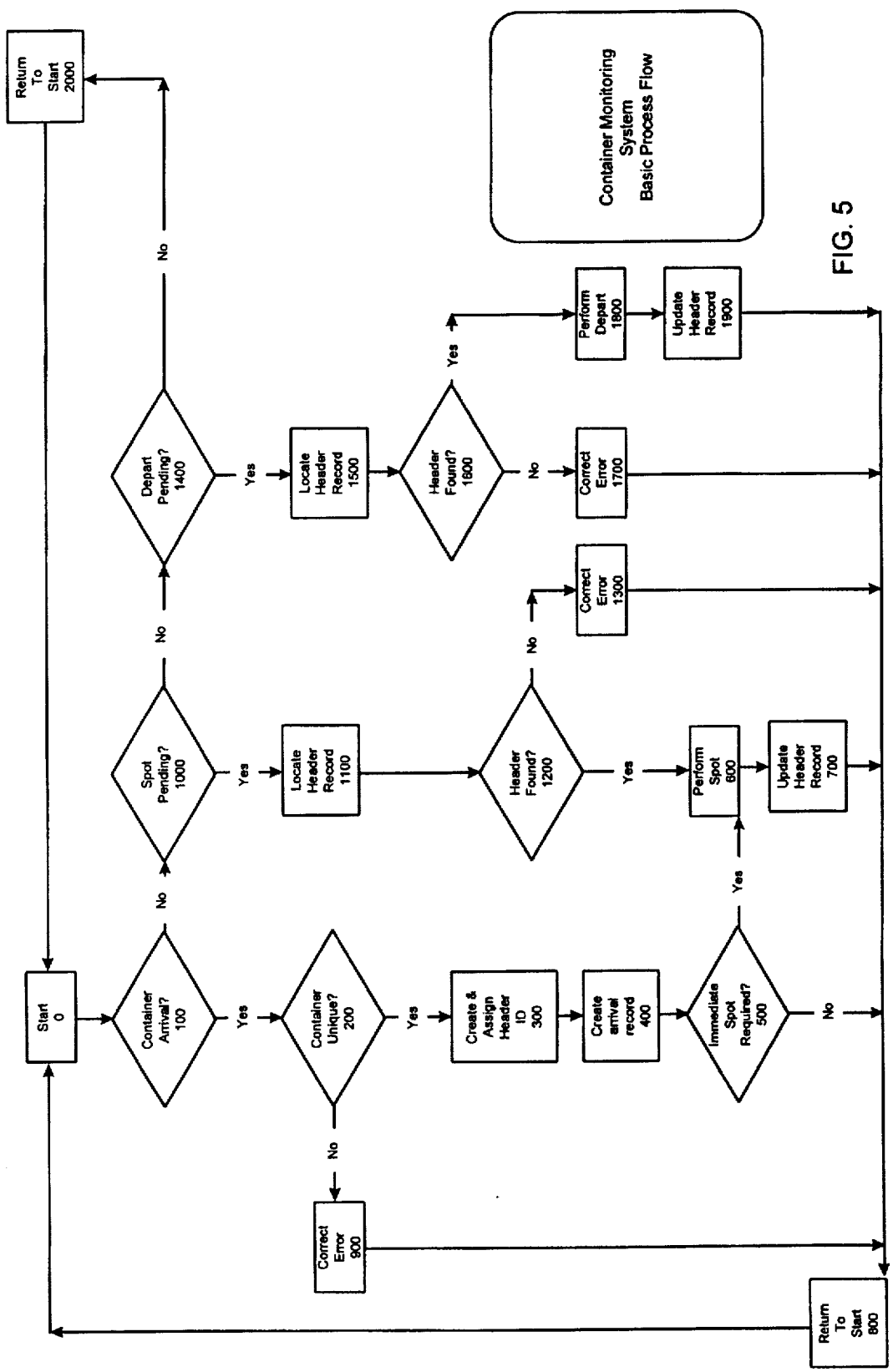
FIG. 5 is a flow diagram of processing steps of the container monitoring system of the invention.

FIG. 5 schematically illustrates one processing flow for monitoring containers in accordance with the invention, which steps may preferably be performed by an appropriately programmed computer such as the CMCS. The computer program generates screen displays for presentation on a connected monitor to an operator of the system. The screen displays provide graphical and/or tabulat or spread sheet type formats for entry and verification of container data, and control menus for accessing different types of information on containers in the system.

The process begins at step 0, proceeding to step 100 to determine arrival of a container. Step 200 insures that each arriving container is uniquely identified by the system. FIGS. 6A–6C are representative of types of screen displays which may be generated by the CMCS computer program for input and display of container information at a CMCS monitor. For example, a screen display such as FIG. 6A provides a format for a container identification header to be created at step 300. The header is used as a virtual data envelope by and through which all data relevant to an identified container is accessible, transferrable, manipulable. An arrival record is created at step 400. Step 500 is provided to accommodate containers which must be immediately "spotted" or moved to yard or dock, for example based upon information received from the customer MIS identifying "hot" loads. In lieu of an immediate spot, arriving containers are spotted to a yard at step 600 and the header record updated at step 700 with yard location, which may also include a subdesignation of a parking spot within a yard. FIG. 6B is a trailer spot update input screen display. At step 1000, loaded containers are summoned to a receiving dock, based upon instructions received from the customer, the header record for the summoned container located at step 1100 such as by inputting container identification via the input screen display of FIG. 6C, with intermediate error correction steps 1200 and 1300, and a container spot or transfer performed and similarly updated to the system at steps 600 and 700. Containers departing from the premises are monitored at step 1400 which again requires locating the corresponding header record at step 1500 via screen display of FIG. 6C, with error correction for no data match at steps 1600 and 1700, the departure of containers input and updated to the system at steps 1800 and 1900. By performing these steps in connection with the CMCS programmed to follow and prompt users through the sequence, and by controlling the plant entry points and premises, the system maintains accurate records of identification, location and load status of all containers on the premises and the amount of time containers are on the premises.

What is claimed is:

1. A container monitoring system for accumulating and storing information on shipping containers including container location and container load status, the system comprising:
    a receiving area for receiving containers to be monitored by the system, said receiving area within a defined boundary within which containers are to be monitored by the system,
    a container entry point at the boundary at which containers are identified by pre-existing identification codes which are recorded at the container entry point,
    a switching vehicle for moving containers to and from a receiving area and to and from a facility within the boundary according to instructions received from the facility, and
    means for recording information on locations and load status of containers within the defined boundary.

2. The container monitoring system of claim 1 further comprising a container monitoring control system for receiving, storing and reproducing carrier and container identification codes and container location data.

3. The container monitoring system of claim 2 further comprising a communications link between the container monitoring control system and a customer management information system whereby the customer management information system can receive container identification and location data from the container monitoring control system.

4. The container monitoring system of claim 2 further comprising a communications link between the container monitoring control system and a carrier management information system, whereby a carrier management information system can receive container identification and location data from the container monitoring control system.

5. The container monitoring system of claim 1 wherein the container monitoring control system and a data entry terminal connected to the container monitoring control system is located at the code identification and container entry point.

6. The container monitoring system of claim 1 wherein the receiving area is within the boundary.

7. The container monitoring system of claim 1 wherein the receiving area is outside the boundary.

8. The container monitoring system of claim 2 further comprising mobile telecommunications means associated with the switching vehicle whereby movements of containers by the switching vehicle are communicated to the container monitoring control system via the mobile telecommunications means.

9. A method for monitoring location and load status of shipping containers comprising the steps of:
    identifying carriers and containers by identification codes at a point of entry to a facility,
    recording identification codes of containers to be monitored,
    moving a container from the point of entry to a receiving area and recording the location of the container within the receiving area,
    moving a container from a receiving area via a switching vehicle to a final destination according to instructions received from the facility and recording the location of the final destination of the container,
    moving the container from the final destination to a receiving area and recording the receiving area location of the container and the status of a load in the container.

10. The method of claim 9 further comprising the steps of recording an empty load status of a container.

11. The method of claim 10 further comprising the step of reporting an empty load status of a container to a corer associated with an empty container.

12. The method of claim 9 further comprising the step of defining a boundary within which containers are monitored and identifying containers at a point of entry located at the defined boundary.

13. The method of claim 9 further comprising the steps of moving a container from a receiving area back to a final destination and back to a receiving area and recording all moves of the container between a receiving area and a final destination.

14. The method of claim 9 further comprising the step of communicating information on all movement of a container to and from receiving areas and final destinations from a container movement vehicle to a container monitor control system.

15. The method of claim 9 further comprising the step of monitoring load status of a container at receiving areas and final destinations.

16. The method of claim 9 further comprising the step of recording container information on container location and load status by entry of data into a container monitor control system.

17. The method of claim 9 further comprising the step of verifying recorded container locations in receiving areas.

18. The method of claim 9 further comprising the step of monitoring racks within containers.

19. The method of claim 9 further comprising the step of generating reports which contain information recorded on monitored containers.

* * * * *

UNITED STATES PATENT AND TRADEMARK OFFICE
CERTIFICATE OF CORRECTION

PATENT NO. : 5,712,789
DATED : Jan. 27, 1998
INVENTOR(S) : Joseph E. Radican

It is certified that error appears in the above-indentified patent and that said Letters Patent is hereby corrected as shown below:

col. 10, line 49, claim 11
"corer" should be "carrier"

Signed and Sealed this

Fourteenth Day of July, 1998

Attest:

BRUCE LEHMAN

Attesting Officer     Commissioner of Patents and Trademarks